United States Patent
Hammad et al.

(10) Patent No.: US 12,181,622 B2
(45) Date of Patent: Dec. 31, 2024

(54) SIMULTANEOUS COMMON-OFFSET MIGRATION

(71) Applicant: SAUDI ARABIAN OIL COMPANY, Dhahran (SA)

(72) Inventors: Hussain I. Hammad, Tarut (SA); Ramzy M. Al-Zayer, Tarout (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 390 days.

(21) Appl. No.: 17/652,849

(22) Filed: Feb. 28, 2022

(65) Prior Publication Data
US 2023/0273333 A1 Aug. 31, 2023

(51) Int. Cl.
*G01V 1/30* (2006.01)
*E21B 43/16* (2006.01)
*G01V 1/28* (2006.01)

(52) U.S. Cl.
CPC .......... *G01V 1/305* (2013.01); *E21B 43/16* (2013.01); *G01V 1/282* (2013.01); *E21B 2200/20* (2020.05); *G01V 2210/6161* (2013.01); *G01V 2210/6222* (2013.01); *G01V 2210/66* (2013.01)

(58) Field of Classification Search
CPC ............ G01V 1/305; G01V 1/282; G01V 2210/6161; G01V 2210/6222; G01V 2210/66; E21B 2200/20; E21B 43/16
See application file for complete search history.

(56) References Cited

U.S. PATENT DOCUMENTS

| | | | |
|---|---|---|---|
| 6,021,094 A | 2/2000 | Ober et al. | |
| 7,599,798 B2 | 10/2009 | Beasley et al. | |
| 8,295,124 B2 | 10/2012 | Abma | |
| 8,526,269 B2* | 9/2013 | Kamata | G01V 1/44 181/102 |
| 9,250,336 B2 | 2/2016 | Eick et al. | |
| 11,573,346 B2* | 2/2023 | Nasser | G01V 1/186 |
| 11,644,589 B2* | 5/2023 | Le Guern | G01V 1/282 702/16 |

OTHER PUBLICATIONS

Biondo L. Biondi, "Efficient Wavefield-continuation Methods for Prestack Migration", 3D Seismic Imaging; Society of Exploration Geophysicists; Ch. 7; Jan. 1, 2006; pp. 83-102 (20 pages).

(Continued)

*Primary Examiner* — Elias Desta
(74) *Attorney, Agent, or Firm* — Osha Bergman Watanabe & Burton LLP

(57) ABSTRACT

A system and method for forming a seismic image of a subterranean region of interest are provided. The method includes obtaining an observed seismic dataset for the subterranean region of interest and determining a plurality of common-offset sections from the observed seismic dataset. The method further includes determining stochastically migrated common-offset sections for each of the common-offset sections and forming a stochastic image gathers from the plurality of stochastically migrated common-offset sections. The method still further includes forming the seismic image by stacking each of the plurality of stochastically migrated common-offset sections.

20 Claims, 8 Drawing Sheets

(56) References Cited

OTHER PUBLICATIONS

Biondo L. Biondi, "Imaging and Aliasing", 3D Seismic Imaging; Society of Exploration Geophysicists; Ch. 8; Jan. 1, 2006; pp. 103-121 (19 pages).
Ehinger et al.; "Green's function implementation of common-offset, wave-equation migration", Geophysics; vol. 61; No. 6; Nov. 1, 1996; pp. 1813-1821 (9 pages).
John T. Etgen; "3D Wave Equation Kirchhoff Migration", SEG Technical Program Expanded Abstracts 2012; Oct. 25, 2012; pp. 1-5 (5 pages).
Krebs et al.; "Fast full-wavefield seismic inversion using encoded sources", Geophysics; vol. 74; No. 6; Nov. 1, 2009; pp. WCC177-WCC188 (12 pages).
Romero et al.; "Phase encoding of shot records in prestack migration", Geophysics; vol. 65; No. 2; Nov. 23, 1999; pp. 426-436 (11 pages).
C. B. Boonyasiriwat and G. T. Schuster; "3D Multisource Full-Waveform Inversion using Dynamic Random Phase Encoding", SEG Technical Program Expanded Abstracts 2010; Oct. 21, 2010; pp. 1044-1049 (6 pages).
P. C. Sava and S. Fomel; "Angle-domain common-image gathers by wavefield continuation methods", Geophysics; vol. 68; No. 3; May 29, 2003; pp. 1065-1074 (10 pages).
S. M. Deregowski; "Common-offset migrations and velocity analysis", First Break; vol. 8; No. 6; Jun. 1, 1990; pp. 225-234 (10 pages).

\* cited by examiner

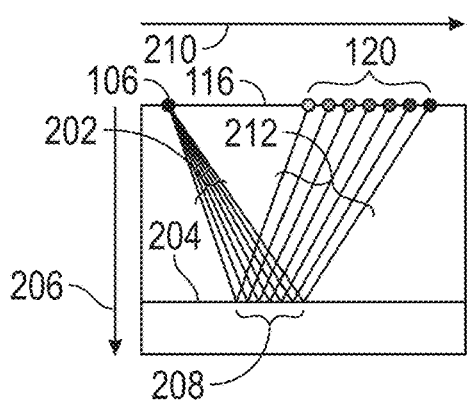
FIG. 2A
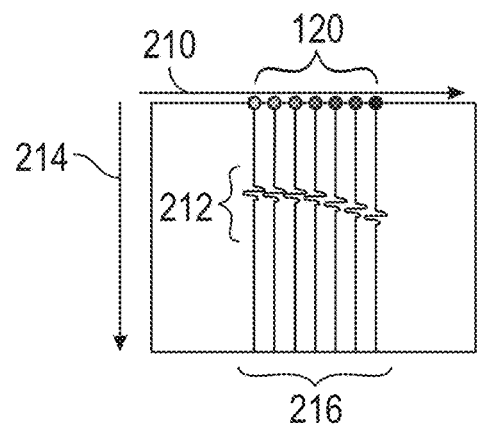
FIG. 2B
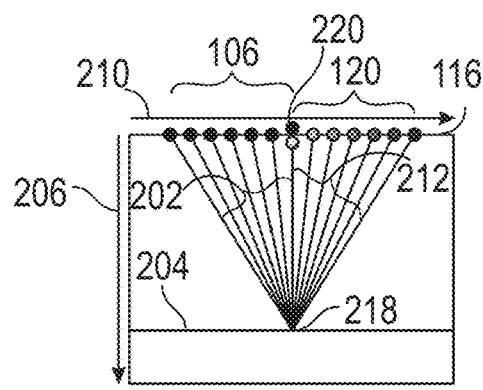
FIG. 2C
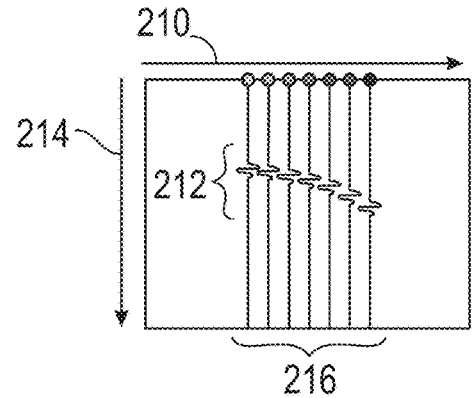
FIG. 2D
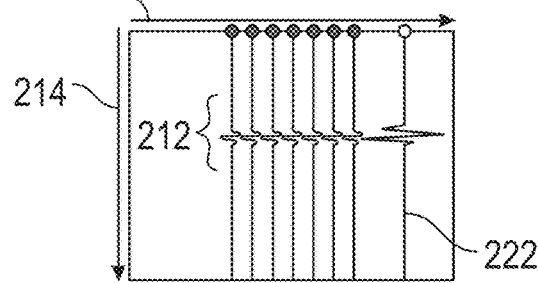
FIG. 2E
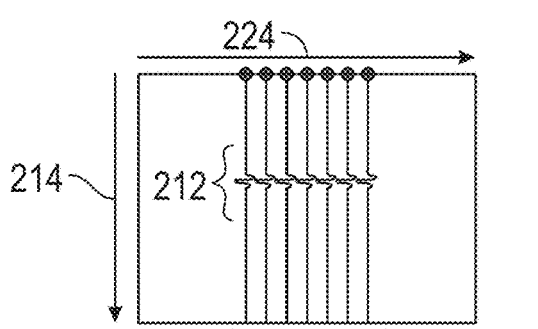
FIG. 2G
FIG. 2F

SIMULTANEOUS COMMON-OFFSET MIGRATION

BACKGROUND

Seismic surveys are frequently conducted by participants in the oil and gas industry. Seismic surveys are conducted over subsurface regions of interest during the search for, and characterization of, hydrocarbon reservoirs. In seismic surveys, a seismic source generates seismic waves that propagate through the subterranean region of interest and are detected by seismic receivers. The seismic receivers detect and store a time-series of samples of earth motion caused by the seismic waves. The collection of time-series of samples recorded at many receiver locations generated by a seismic source at many source locations constitutes a seismic data set.

To determine earth structure, including the presence of hydrocarbons, the seismic data set may be processed. Processing a seismic data set includes a sequence of steps designed to correct for a number of issues, such as near-surface effects, noise, irregularities in the seismic survey geometry, etc. Critical steps in processing seismic data include the generation of a velocity model and seismic migration. Seismic migration is a process by which seismic events are re-located in either space or time to their true subsurface positions. A properly processed seismic data set may aid in decisions as to if and where to drill for hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for forming a seismic image of a subterranean region of interest. This method includes obtaining an observed seismic dataset for the subterranean region of interest and determining a plurality of common-offset sections from the observed seismic dataset. The method also includes determining stochastically migrated common-offset sections for each of the common-offset sections. Stochastic image gathers may be formed from the plurality of stochastically migrated common-offset sections and the seismic image may be formed by stacking each of the plurality of stochastically migrated common-offset sections.

In general, in one aspect, embodiments relate to a non-transitory computer readable medium storing instructions executable by a computer processor, the instructions including functionality for obtaining an observed seismic dataset for the subterranean region of interest and determining a plurality of common-offset sections from the observed seismic dataset. The instructions also include functionality for determining a stochastically migrated common-offset section for each of the common-offset sections, forming stochastic image gathers from the plurality of stochastically migrated common-offset sections and forming the seismic image by stacking each of the plurality of stochastically migrated common-offset sections. The instructions also include the functionality for identifying a target within the subterranean region of interest with a likelihood of containing hydrocarbons based on the seismic image.

In general, in one aspect, embodiments relate to a system that includes a seismic acquisition system configured to acquire an observed seismic dataset and a seismic processor. The seismic processor from the system is configured to receive the observed seismic dataset from the seismic acquisition system, determine a plurality of common-offset sections from the observed seismic dataset and determine a stochastically migrated common-offset section from each common-offset section. The seismic processor is also configured to form a plurality of stochastic image gathers from the plurality of stochastically migrated common-offset sections and form the seismic image by stacking each of the plurality of stochastically migrated common-offset sections. The seismic processor is further configured to identify a target within the subterranean region of interest with a likelihood of containing hydrocarbons based on the denoised seismic image.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 2A-2G shows seismic gathers in accordance with one or more embodiments.

DETAILED DESCRIPTION

Figure 1:
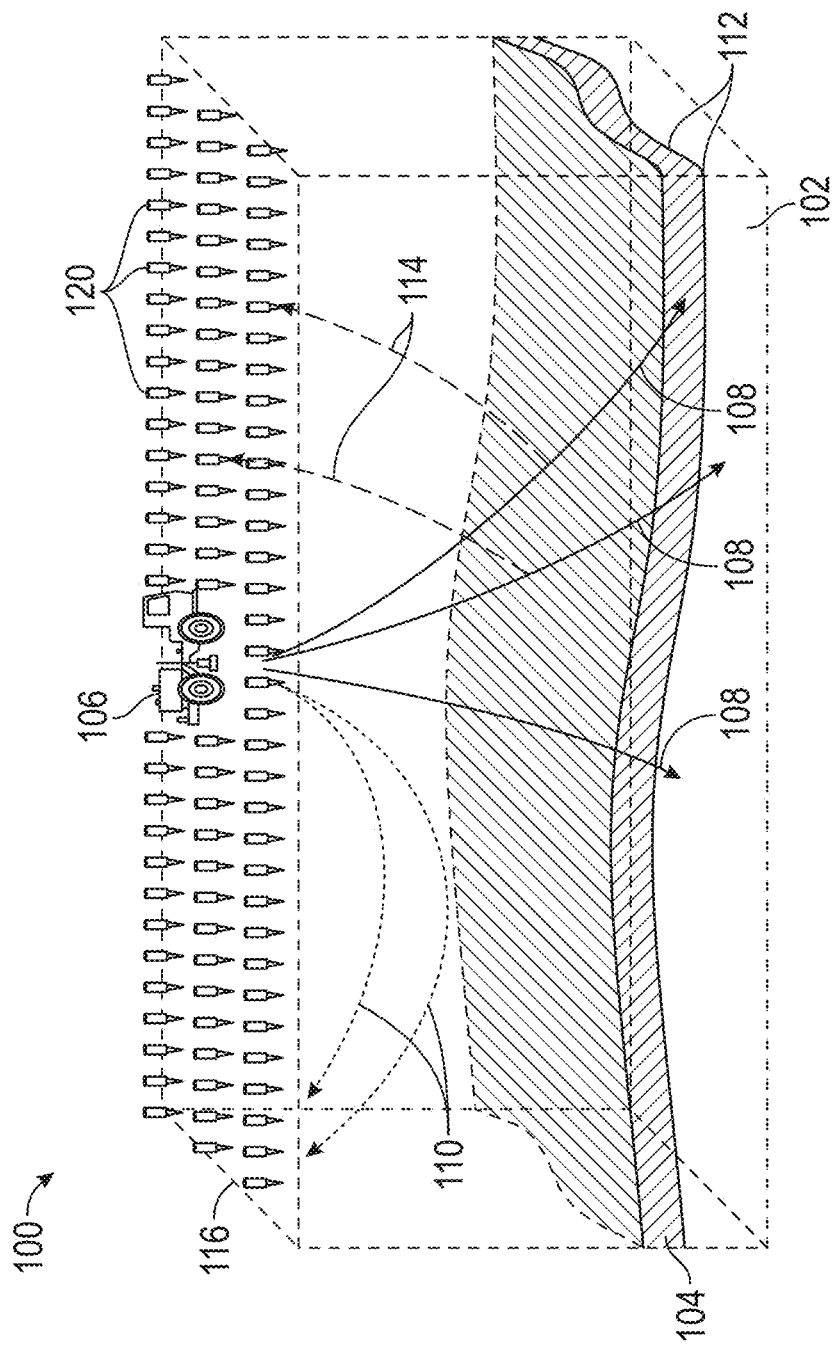
FIG. 1 depicts a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic data set" includes reference to one or more of such seismic data set.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

The term "seismic data" as used herein broadly means any data received and/or recorded as part of the seismic surveying process, including particle displacement, velocity and/or acceleration, pressure and/or rotation, wave reflection, and/ or refraction data. "Seismic data" is also intended to include any data (e.g., seismic image, migration image, reverse-time migration image, pre-stack image, partially-stack image, full-stack image, post-stack image or seismic attribute image) or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended.

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which is ray paths obeying Snell's law can be traced.

A velocity model represents the seismic velocity or the speed with which a seismic wave propagates through a subsurface material. Different subsurface materials may exhibit different seismic velocities. A velocity model may be determined from a seismic dataset using a variety of methods, known to a person of ordinary skill in the art, collectively called "velocity analysis".

Geological model is a spatial representation of the distribution of sediments and rocks (rock types) m the subsurface.

Conditioning data refers a collection of data or dataset to constraint, infer or determine one or more reservoir or stratigraphic models. Conditioning data might include geophysical models, petrophysical models, seismic images (e.g., fully-stacked, partially-stacked or pre-stack migration images), well log data, production data and reservoir structural framework.

Geological discontinuities in the subsurface, such as the boundary between geological layers, frequently generate seismic reflections when illuminated by seismic waves. These geological discontinuities are often called "seismic reflectors". To form a seismic image of seismic reflectors the recorded seismic dataset must be processed. The image forming portion of this processing is known as "seismic migration". Seismic migration takes seismic reflections as input and locates the position of the corresponding seismic reflector in horizontal space and either depth or time. Seismic migrations are usually the most computationally intensive, time consuming, and costly aspects of seismic data processing. Seismic migrations require a velocity model that specifies an estimate of the propagation velocity of seismic waves within the subsurface region from which the seismic dataset was acquired. Seismic velocity models may be estimated by comparing the seismic images generated from seismic reflections recorded by seismic receivers at different separations "offsets" from the seismic source. Typically, this comparison is done using "image gathers", each of which display the seismic image at a single horizontal location and a range of offsets. Image gathers may also be used for other type of processes including noise and multiple attenuation. Examples of image gathers being used for velocity analysis is discussed further in FIGS. 5 and 6.

The typical digital size of seismic datasets continues to grow as the number of receivers that can be simultaneously recorded by a seismic acquisition system increase. Thus, the need for efficient imaging solutions grows more acute. Many migration methods are "shot-based", meaning the input seismic dataset must be sorted into shot gathers. A shot gather is a collection of traces that originate from the same seismic source or shot, recorded by a plurality of receivers. Shot gathers are depicted in FIG. 2B. One effective known strategy to reduce the computational cost of a migration is to use shot-encoding or "super-shotting" for these shot-based migrations. Super-shotting combines the seismic data from many shot gathers into a single super-gather that can be migrated for the approximate cost of migrating a single-shot gather. Migrations that implement phase-encoding techniques such as super-shotting however, do not provide image gathers that can be used for velocity analysis and other type of processes including noise and multiple attenuation.

The embodiments disclosed herein describe methods and systems for a simultaneous common-offset migration of a seismic dataset. The disclosed method migrates entire common-offset sections one at a time. The common-offset migrations may then be combined to produce both stochastic image gathers that can be used for further seismic data processing steps, such as velocity analysis and multiple attenuation, and seismic images for locating subsurface hydrocarbon reservoirs.

The simultaneous common-offset migration method disclosed includes certain advantages of phase encoding which provides an efficient way to perform seismic migration, by migrating entire common-offset sections one at a time. The simultaneous common-offset migration method also provides stochastic image gathers that can be used for velocity analysis and other type of processes, similar to the more expensive trace-by-trace migrations FIG. 1 shows a seismic survey (100) of a subterranean region of interest (102), which may contain a reservoir (104). The seismic survey (100) may utilize a seismic source (106) on the surface of the earth (116) that generates radiated seismic waves (108). The radiated seismic waves (108) may return to the surface as refracted seismic waves (110) or may be reflected by geological discontinuities (112) and return to the surface as reflected seismic waves (114). At the surface, the refracted seismic waves (110) and reflected seismic waves (114) may be detected by seismic receivers (120).

In some embodiments, the refracted seismic waves (110) and reflected seismic waves (114) generated by a single activation of the seismic source (106) are recorded by a seismic receiver (120) as a time-series representing the amplitude of ground-motion at a sequence of discreet times. This time-series may be denoted a seismic "trace". The seismic receivers (120) are positioned at a plurality of seismic receiver locations that we may denote $(x_r, y_r)$ where x and y represent orthogonal axes on the surface of the earth (116) above the subterranean region of interest (102). Thus, the refracted seismic waves (110) and reflected seismic waves (114) generated by a single activation of the seismic source (106) may be represented as a three-dimensional "3D" volume with axes $(x_r, y_r, t)$ where $(x_r, y_r)$ represents the location of the seismic receiver (120) and t delimits the time sample at which the amplitude of ground-motion was measured.

A seismic survey (100) also may include recordings of seismic waves generated by a seismic source (106) that is positioned at a plurality of seismic source locations denoted $(x_s, y_s)$. Thus, all the data acquired by a seismic survey (100) may be represented as a five-dimensional volume, with coordinate axes $(x_s, y_s, x_r, y_r, t)$ and denoted a "seismic data set".

A seismic data set must be processed to generate a seismic velocity model of the subterranean region of interest (102) or an image of seismic reflectors within the subterranean region of interest (102). Seismic reflectors may be of the geological boundaries, such as the boundaries between geological layers, the boundaries between different pore fluids, faults, fractures or groups of fractures within the rock.

Processing a seismic data set comprises a sequence of steps designed, without limitation, to do one or more of the following: correct for near surface effects; attenuate noise; compensate for irregularities in the seismic survey geometry; calculate a seismic velocity model; image reflectors in the subsurface; calculate a plurality of seismic attributes to characterize the subterranean region of interest (102); and aid in decisions governing where to drill for hydrocarbons.

FIGS. 2A-2G depicts various stages of arrangements of seismic data, in accordance with one or more embodiments. FIG. 2A depicts seismic waves (202) radiating from a seismic source (106), reflecting from a seismic reflector (204) at a depth indicated by the vertical axis (206) and a plurality of horizontal reflection points (208), propagating as seismic reflections (212) back to the surface of the earth (116) and being recorded by an array of seismic receivers (120) covering a range of offsets (210) indicated by the horizontal axis. FIG. 2A depicts the acquisition geometry for recording a shot gather, depicted in FIG. 2B.

FIG. 2B depicts the plurality of seismic traces (216) recorded by the array of seismic receivers (120). These seismic traces (216), originating from a single seismic source location $(\bar{x}_s, \bar{y}_s)$, maybe denoted $D(t, x_r, y_r, \bar{x}_s, \bar{y}_s)$ and may be called a "source gather" or a "shot gather". The seismic reflections (212) may be detected on traces within a shot gather at increasing two-way travel times, indicated on the vertical axis (214), as the distance between the seismic source and the receiver, typically called "offset" (210) increases as indicated by the horizontal axis. This phenomenon of increasing two-way travel time with offset is often called "moveout".

FIG. 2C depicts an alternative sorting of the seismic dataset that is used for the seismic denoising method, in accordance with one or more embodiments. FIG. 2C depicts seismic waves (202) radiating from a plurality of seismic sources (106), reflecting from a seismic reflector (204) at a depth indicated by the vertical axis (206). This single reflection point (218) of the seismic waves occurs at the same point on the seismic reflector (204) for all traces in the common-midpoint gather. Seismic reflections (212) propagate back to the surface of the earth (116) from this single reflection point (218) and are recorded by an array of seismic receivers (120) at an increasing offset (210) indicated by the horizontal axis. The seismic sources (106) and the seismic receivers (120) shown are selected to have a common midpoint (220), i.e., the point on the surface halfway between the seismic source (106) and seismic receiver (120) that is shared by all the selected seismic source-seismic receiver pairs. In practice, due to spatial irregularities in the seismic source (106) and seismic receiver (120) geometry, the halfway point of the selected seismic source (106) and seismic receiver (120) may not be identical but rather lie within a small range ("bin") of spatial locations. Such an arrangement of selected seismic data may be called a "common midpoint (CMP) gather". In many cases, a common midpoint gather may be more convenient than a shot gather because the reflection point of the seismic waves occurs at the same point (218) on the seismic reflector for all traces in the common-midpoint gather.

FIG. 2D depicts the plurality of seismic traces (216) of a CMP gather. The traces in a CMP gather may be denoted $D(t, x_o + \bar{x}_m, y_o + \bar{y}_m, x_o - \bar{x}_m, y_o - \bar{y}_m)$, where $(\bar{x}_m, \bar{y}_m)$ is the location of the midpoint and $(\bar{x}_o, \bar{y}_o)$ are vectors of offsets in the x- and y-directions. The seismic reflections (212) detected on seismic traces in a midpoint gather also exhibit two-way travel time. The two-way travel time of seismic reflections (212) detected on seismic traces may be said to form a "pre-stack horizon" at an increasing two-way travel time, indicated on the vertical axis (214), and at an increasing offset (210) indicated by the horizontal axis, $t_A(x_o + \bar{x}_m, y_o + \bar{y}_m, x_o - \bar{x}_m, y_o - \bar{y}_m)$. CMP gathers are widely used in velocity analysis, to perform a moveout corrections. The seismic reflections (212) may be "flattened" or moveout corrected, by picking a seismic velocity model which results in a flattened pre-stack horizon, shown in FIG. 2E.

FIG. 2E shows a pre-stack CMP gather after a correction for two-way travel time moveout. After a correction for two-way travel time moveout, all of the seismic reflections (212) depicted on seismic traces form a single, flat seismic reflector arriving at the same moveout-corrected time indicated by the vertical axis (214) as the offset (210) of the detecting receiver increases along the horizontal axis. The corrected seismic traces (216) may be summed ("stacked") to form a post-stack seismic trace (222). Stacking is an essential part of seismic data processing and the post-stack seismic trace (222) may have a higher signal-to-noise ratio than traces in the CMP gather as random noise attenuated.

FIG. 2F shows an alternative sorting of the seismic dataset into a common-offset section. FIG. 2F depicts seismic waves (202) radiating from a group of seismic sources (106), reflecting from a seismic reflector (204) at a depth indicated by the vertical axis (206) and a plurality of horizontal reflection points (208), propagating as seismic reflections (212) back to the surface of the earth (116) and recorded by an array of seismic receivers (120). In FIG. 2F the seismic sources (106) and the seismic receivers (120) are arranged to have a common offset (226), that is the source-receiver horizontal separation distance is equal between each source-receiver pair in a common-offset section shown at a horizontal location (224) indicated on the horizontal axis. Common-offset traces may share a common offset (226); however, each have a different horizontal reflection point (208) and different midpoints and may hence provide a spatial map of subsurface reflectors.

FIG. 2G shows the common-offset section with seismic reflections (212) detected on seismic traces (216) at a moveout-corrected time indicated by the vertical axis (214) as the horizontal location (224) of the detecting receiver increases along the horizontal axis. Each common-offset trace in a common-offset section has different horizontal reflection points (208) and therefore common-offset sections may be used for may be used for an initial or coarse mapping of seismic reflectors in the subsurface. The common-offset section may include traces with the exact same offset, or an offset that contains values within the limits of a predefined offset range. The simultaneous common-offset migration required the seismic dataset to be sorted into common-offset sections.

Figure 3:
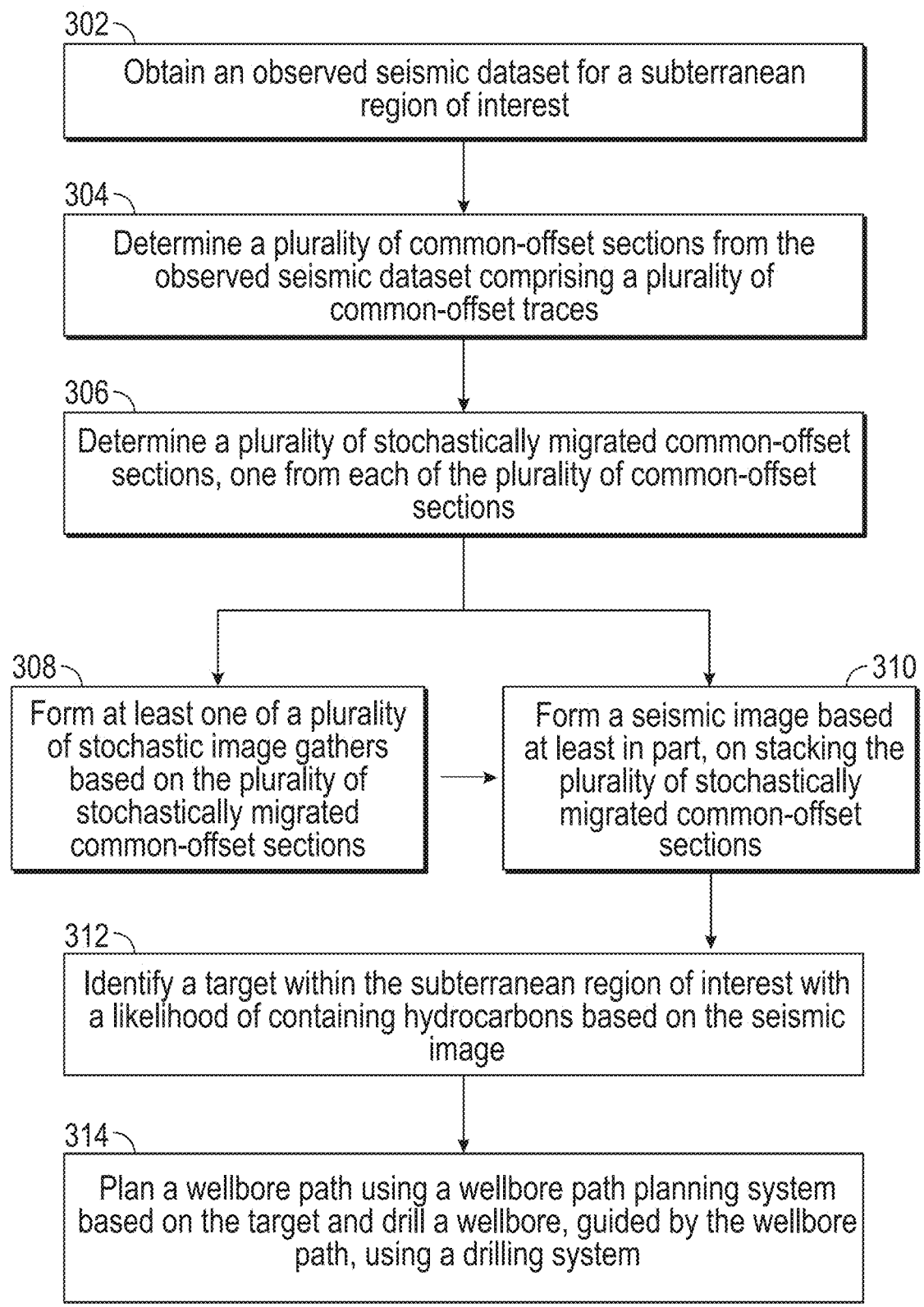
FIG. 3 shows a flowchart in accordance with one or more embodiments.

FIG. 3 shows a flowchart in accordance with one or more embodiments. The flowchart outlines a method for a simultaneous common-offset migration of an observed seismic dataset for a subterranean region of interest.

In Step 302, in accordance with one or more embodiments, an observed seismic dataset for a subterranean region of interest is obtained. An observed dataset may be acquired by activating a physical seismic source at a plurality of locations and recording the actual resulting vibrations of the earth using physical seismic receivers. The observed seismic dataset may be composed of a plurality of observed seismic traces each recorded using a physical seismic receiver.

In Step 304, in accordance with one or more embodiments, a plurality of common-offset sections may be determined from the observed seismic dataset each including a plurality of common-offset traces. Determining the plurality of common-offset sections includes selecting a plurality of traces from the observed seismic dataset, each recorded by a source-receiver pair having a source-receiver separation distance within a predetermined range. While the plurality of traces may have a common offset, they each have a different midpoint and hence may provide a spatial map of subsurface reflectors.

In Step 306, in accordance with one or more embodiments, a plurality of stochastically migrated common-offset sections may be determined, one from each of the plurality of common-offset sections. Each stochastic migration includes a number of realizations performed sequentially until a predetermined maximum number of realizations has been reached. Each one of a plurality of common-offset sections, determined in Step 304 may be stochastically migrated individually and separately from the other common-offset sections. In accordance with some embodiments, the stochastic migration may be performed one common-offset section at a time, storing each stochastically migrated common-offset section before proceeding to the next common-offset section until every common-offset section determined in Step 304 has been migrated. In accordance with other embodiments, the stochastic migration of two or more common-offset sections may be performed in parallel and the resulting stochastically migrated common-offset sections stored separately for later use. Further details of Step 306 are provided in FIG. 4, which describes the method to create a single stochastically migrated common-offset section.

After Step 306 either Step 308 or Step 310 may be performed or both Step 308 and Step 310 may be performed. If both Steps 308 and 310 are performed, Step 308 may precede or follow Step 310, or both Step 308 and Step 310 may be performed in parallel.

In accordance with one or more embodiments, a plurality of stochastic image gathers may be formed in Step 308 from a plurality of stochastically migrated common-offset sections now determined.

In Step 308, in accordance with one or more embodiments, at least one of a plurality of stochastic image gathers are formed, based on the plurality of stochastically migrated common-offset sections. Forming a stochastic image gather may only require selecting an appropriate portion of the stochastically migrated common-offset section corresponding to a single horizontal position from each of the stochastically migrated common-offset sections. The stochastic image gather may be used to determine, evaluate, or update a seismic velocity model as described in FIGS. 2D and 2E. The totality of traces from each stochastically migrated common-offset section, may be combined into common midpoints and sorted by increasing offset. FIGS. 5 and 6 show examples of the stochastic image gathers and how they are used in velocity analysis.

In Step 310, in accordance with one or more embodiments the seismic image may formed based, at least in part, on stacking each of the plurality of stochastically migrated common-offset sections. The noise that may be present in a seismic dataset may be reduced, or "stacked out", by stacking. Stacking is common seismic imaging technique familiar to those skilled in the art and increases the signal to noise ratio in the seismic image.

In Step 312, in accordance with one or more embodiments, a target may be identified within the subterranean region of interest with a likelihood of containing hydrocarbons based on the seismic image. The simultaneous common-offset migration has relocated the seismic events to their true subsurface positions where a target may be more easily identifiable. The seismic image may aid in decisions as to if and where to drill for hydrocarbons, based on least in part, on the target identified in Step 312.

In Step 314, in accordance with one or more embodiments, a wellbore path may be planned using a wellbore path planning system, based on the target and a wellbore, guided by the wellbore path, may be drilled using a drilling system. A wellbore path planning system may plan a wellbore path from the surface of the Earth to the target, while avoiding any geohazards in the subsurface. A drilling system drilling a wellbore, guided by the wellbore path is depicted and discussed further in FIG. 7.

Figure 4:
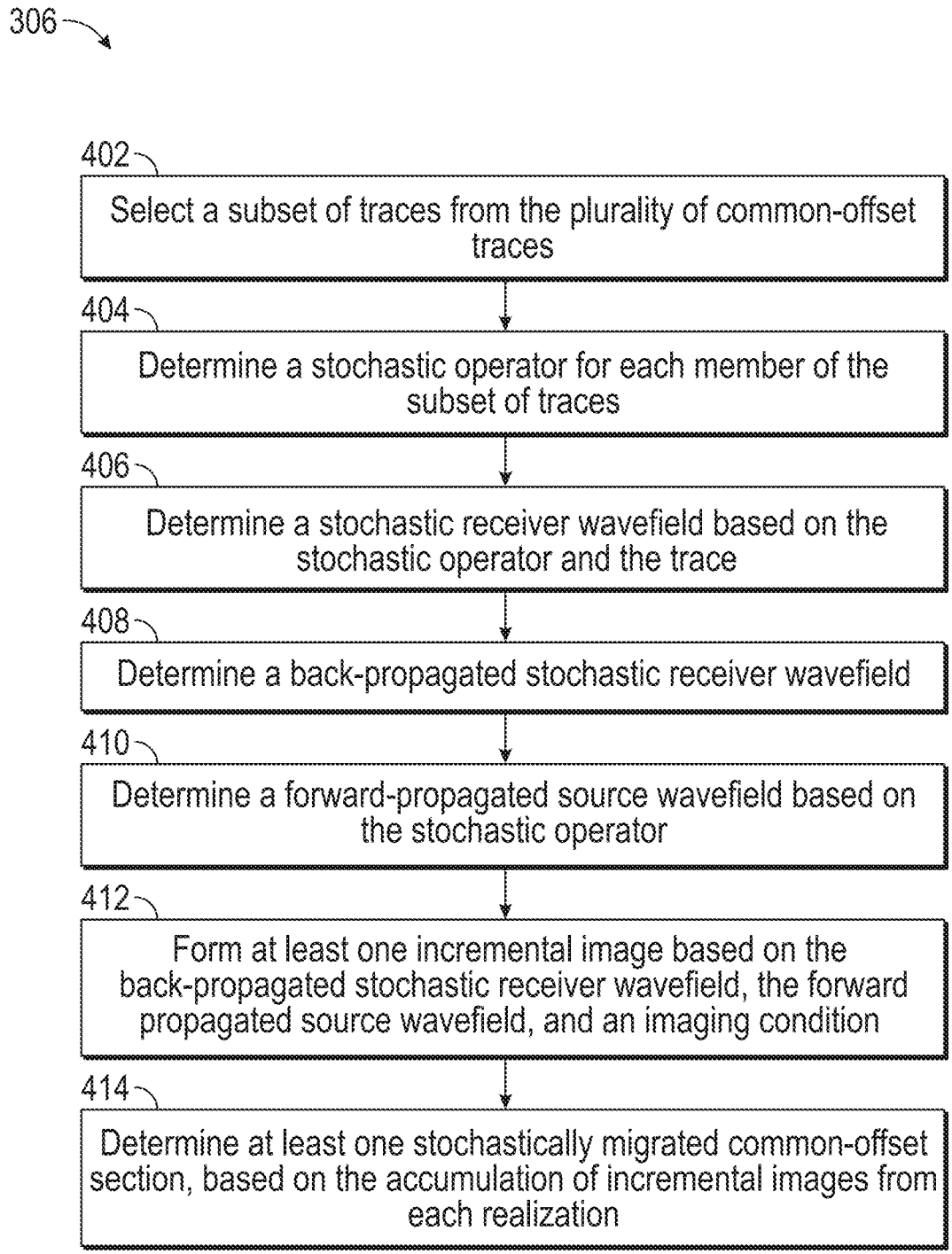
FIG. 4 shows a flowchart in accordance with one or more embodiments.

FIG. 4 shows a flowchart in accordance with one or more embodiments. The flowchart covers more extensively, Step 306 from FIG. 3 and describes the method to determine a single stochastically migrated common-offset section from a single common-offset section. The stochastically migrated common-offset section is determined from a number of realizations. Steps 402 to 412 are repeated for each realization performed.

In Step 402, in accordance with one or more embodiments, a subset of common-offset traces is selected from a single common-offset section. The common-offset traces may be selected randomly, or pseudo randomly from the common-offset traces.

In Step 404 in accordance with one or more embodiments, a stochastic operator is determined for each member of the subset of selected common-offset traces. This stochastic operator $F^{(1)}$ may be defined by:

$$F_i^{(1)} = \begin{cases} 0; & x_m \in Q_1^i \\ e^{k\omega\theta_i(x_m)}; & x_m \in Q_2^i \end{cases} \quad \text{Equation (1)}$$

where $k=\sqrt{-1}$, $x_m$ may be the source location or the receiver location, the phase shifts $\theta$ are chosen randomly, and $\omega$ is the frequency. $Q_1^i$ is a random set of inactive spatial points and $Q_2^i$ is a set of active spatial points that represent a source or receiver location, where i is the realization index.

In Step 406 in accordance with one or more embodiments, a stochastic receiver wavefield is determined based on the stochastic operator and the trace. Each trace from the subset of traces selected in Step 402 may be convolved with the stochastic operator to generate the stochastic receiver wavefield. The stochastic operator may provide random phase shifts. The combination of each stochastic operator and each common-offset trace may be performed in the frequency domain.

In Step 408 in accordance with one or more embodiments, a back-propagated stochastic receiver wavefield may be determined. In some embodiments, back-propagation of the stochastic traces from the corresponding receiver location into the subsurface may be simulated in the frequency domain, such that:

$$B(x,x_m+x_h,\omega)=\Sigma_i F_i^{(1)}(\omega,x_m)G(x,x_m-x_h,\omega)d^*(x_m-x_h, x_m+x_h,\omega) \quad \text{Equation (2)}$$

where x=(x,y) is the lateral image location vector, B is the back-propagated wavefield, $F_i^{(1)}$ the stochastic operator that provides random phase shifts and random locations, co is the frequency, $G(x,x_m-x_h,\omega)$ is a Green's function with a source location at $x_m-x_h$, $d^*(x_m-x_h, x_m+x_h,\omega)$ is the data where the asterisk denotes complex-conjugation in the frequency domain, which is equivalent to time-reversal in the time-domain. In other embodiments, the back-propagation may be simulated in the time domain.

In Step 410 in accordance with one or more embodiments, a forward-propagated source wavefield is determined based on the stochastic operators determined in Step 404. The corresponding sources from the subset of common-offset traces determined in Step 402, are forward propagated with the same stochastic operators used in Step 408, to give a forward-propagated stochastic wavefield. In some embodiments, the stochastic source wavefield may be represented in the frequency domain by:

$$S(x,X_m+x_h,\omega)=\Sigma_j F_j^{(2)}(\omega,x_m)G(x,x_m+x_h,\omega) \quad \text{Equation (3)}$$

where $F_j^{(2)}$ is an operator that provides random phase shifts and random locations at the source side, $G(x,x_m+x_h,\omega)$ is a Green's function with a source at location $x_m+x_h$ and S is the resulting source-side modeled wavefield. The stochastic operators used in Equation 2 and 3 will provide the same random phase shift to both the forward-propagated source wavefield and back-propagated stochastic receiver wavefield for each realization. In other embodiments, the stochastic source wavefield may be determined in the time domain.

In Step 412 in accordance with one or more embodiments, at least one incremental image is formed, based on the back-propagated stochastic receiver wavefield, the forward propagated source wavefield, and an imaging condition. Imaging conditions are used to analyze the match between the source and receiver wavefields at every image location and may be applied to generate the incremental image. In accordance with one or more embodiments, the imaging condition may be the multiplication in the frequency-domain between the back-propagated stochastic receiver wavefield and the forward propagated source wavefield. The imaging condition is known as a "cross-correlation imaging condition". The cross-correlation image conditioning technique is well-known to those skilled in the art. Other imaging conditions known to those skilled in the art, may be used, such as a deconvolution imaging condition without limiting the scope of the invention.

The cross-correlation imaging condition may be written in the frequency domain as:

$$I(x,x_h)=\Sigma_\omega \tau_{x_m} S(x,x_m+x_h,\omega)B(x,x_m+x_h,\omega) \quad \text{Equation (4)}$$

where $I(x,x_h)$ is the resulting image. The imaging condition may determine one incremental image for each realization. Once the incremental image has been created for a first realization of the stochastic operators, the incremental image may be stored. Additional incremental images may be generated using new realizations of the stochastic operators, either sequentially or in parallel. The incremental images may be combined, for example they may be stacked, summed or accumulated, as they are generated or after they have all been generated.

In some embodiments, a predetermined number of realizations to be combined may be set prior to migration. The predetermined number of realizations may predetermined by a person of skilled in the art. The maximum number of realizations may be selected based upon computation time or cost limitations and desired imaging quality. Typically, a larger number of realizations provides a higher image quality when combined, but at a higher cost. In other embodiments, additional incremental images may continue to be generated, using additional realizations of the stochastic operators and randomly selected subset, until some characteristic of the combined incremental images, such as a computed noise level, is reached or until the characteristic ceases to change significantly.

In Step 414 in accordance with one or more embodiments, the stochastically migrated common-offset section is determined based on the accumulation of incremental images from each realization. The entirety of the stochastically migrated image traces from each realization are summed together to form the complete stochastically migrated common-offset section.

The flowchart from FIG. 4 explains how a single common-offset section is imaged. Each common-offset section, one at a time, is migrated, and the totality of stochastically migrated common-offset sections are formed. Stochastic image gathers and the seismic image may be formed according to Steps 308 and 310 respectively.

Figures 5A, 5B:
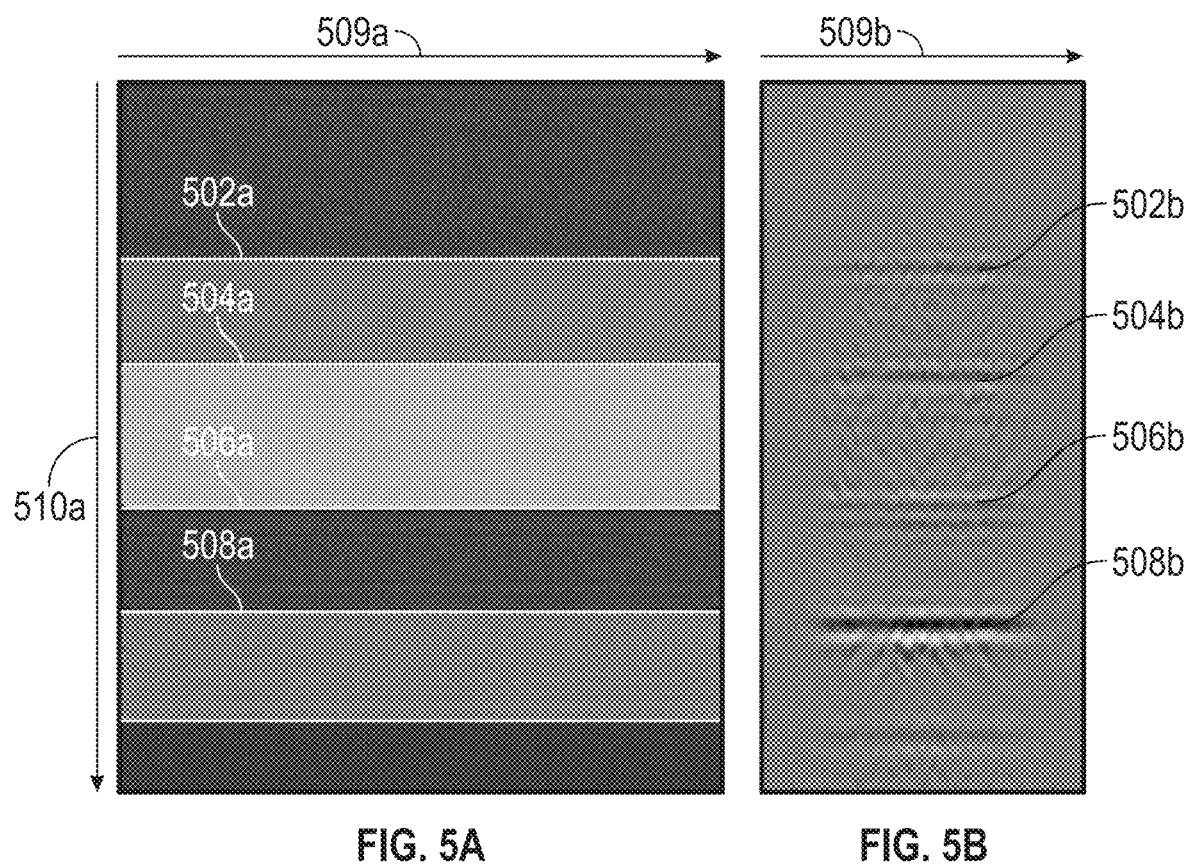
FIGS. 5A-5F shows a seismic data comparison.

FIGS. 5 and 6 both show examples of seismic images and stochastic image gathers, in accordance with one or more embodiments. FIG. 5A shows a simple velocity model, in accordance with one or more embodiments. This velocity model features a plurality of horizontal interfaces, also described as seismic reflectors or subsurface reflectors (for example, seismic reflector (502a), (504a), (506a) and (508a) increasing in depth, indicated by the vertical axis (510a). The horizontal axis (509a) represents the horizontal location of the seismic reflectors.

FIG. 5B shows a seismic image, described in Step 310 from FIG. 3, resulting from a stochastic common-offset migration using only 5 realizations to determine each stochastically migrated common-offset section. FIG. 5B depicts the seismic image that has been formed by stacking the plurality of stochastically migrated common-offset sections. Although the velocity model is simple, a migration is still challenging as the crosstalk is higher for simple models with flat layers when compared to more complex models. Crosstalk is interference resulting from imperfect imaging conditions.

The location of each seismic reflector, e.g., (502a), (504a), (506a) and (508a) may be seen in the seismic image as seismic reflections (502b), (504b), (506b) and (508b). This example illustrates how the simultaneous common-offset migration may image a subterranean region with simple geology.

Figures 5C, 5D, 5E, 5F:
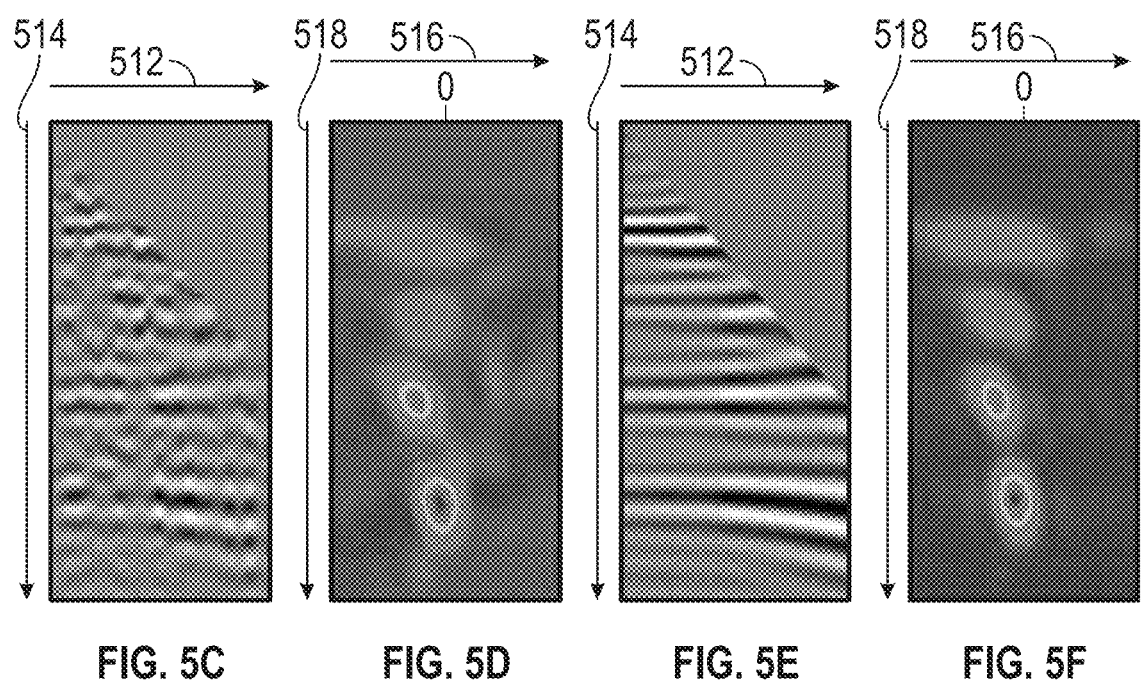

FIG. 5C shows a stochastic image gather resulting from the simultaneous common-offset migration and its corresponding moveout semblance is shown in FIG. 5D. The stochastic image gather shown in FIG. 5C displays seismic reflections at an increasing two-way travel time, indicated by the vertical axis (514). The horizontal axis (512) represents an increasing offset. The stochastic image gather may used in seismic data processing for velocity analysis to determine moveout. Moveout is a process where a velocity model can be updated, by analyzing the flatness of events recorded on a stochastic image gather or a CMP gather and examining a moveout semblance. A velocity function may be picked using the moveout semblance by one skilled in the art.

FIG. 5E shows a migrated CMP resulting from a much more computationally and expensive trace-by-trace RTM and its corresponding moveout semblance shown in FIG. 5F. The CMP shown in FIG. 5E displays seismic reflections at an increasing two-way travel time, indicated by the vertical axis (514). The horizontal axis (512) represents an increasing offset. Comparing the stochastic image gather from FIG. 5C, and the CMP from FIG. 5E, the images are similar and the seismic reflections are visible in both gathers at the same locations.

Comparing the semblances of FIG. 5D and FIG. 5F, the moveout semblance is very similar. The moveout semblance shown in FIGS. 5D and 5F, has a horizontal axis (416) representing moveout, with zero in the center of the horizontal axis, increasing in positive and negative directions moving away from zero. The vertical axis (418) represents depth increasing downwards. One skilled in the art, may use FIG. 5D to update a velocity model and pick a velocity function just as effectively as the semblance generated from the more expensive trace-by-trace migration shown in FIG. 5F.

Figure 6A:
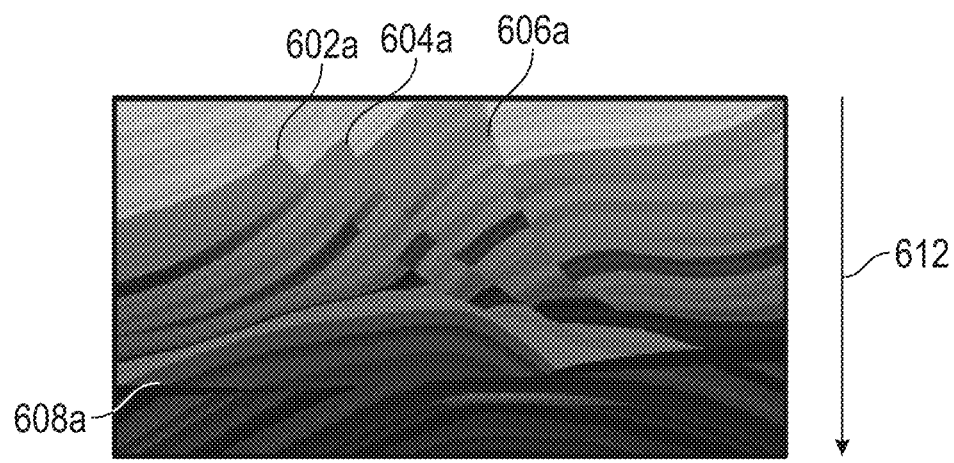
FIGS. 6A-6F shows a seismic data comparison.
Figure 6B:
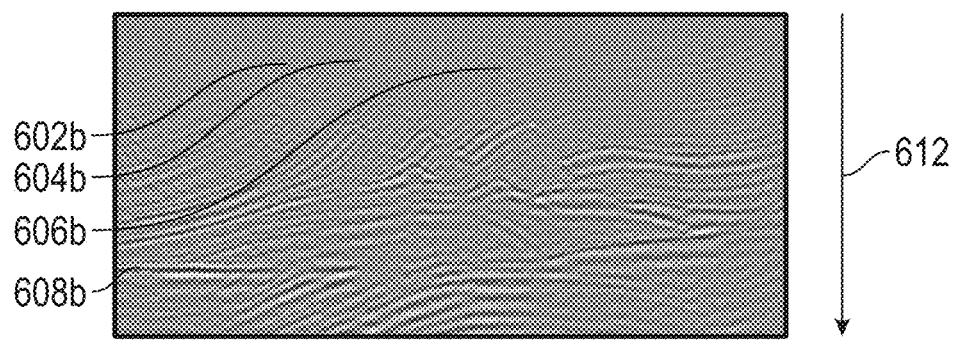

FIG. 6 shows an example of the simultaneous common-offset migration method applied to the Marmousi model. The Marmousi model, shown in FIG. 6A, is a complex 2D velocity model. The Marmousi model is complex by design and contains many thin layers of non-horizontal subsurface reflectors, a series of normal faults resulting in tilted blocks, and a deep unconformity, all which present imaging challenges. The Marmousi model is widely used to evaluated imaging strategies as it represents a very geologically complex area and has a set of benchmark seismic images created from a variety of different imaging strategies for comparison purposes. A synthetic dataset has been created using the Marmousi model and is used as an input to perform a simultaneous common-offset migration, according to the embodiments disclosed herein. The migrated image has been stacked and displayed in FIG. 6B and is compared with the true model to evaluate similarity.

FIG. 6B represents the results of the simultaneous offset migration and can be compared to the true Marmousi model to determine the effectiveness of the subsurface image. The closer the migrated stacked image represents the true velocity model, the more successful the imaging technique is. Many details from the Marmousi model are present in the migrated stacked image which indicates the simultaneous common-offset migration has successfully imaged a hypothetically very challenging area. The three normal faults (602a, 604a, 606a) may be detected on the velocity model, at a depth indicated by the vertical axis (612) and at a horizontal location indicated by the horizontal axis (610). These normal faults are also detected on the stochastically migrated stack (602b, 604b, 606b).

Figures 6C, 6D, 6E, 6F:
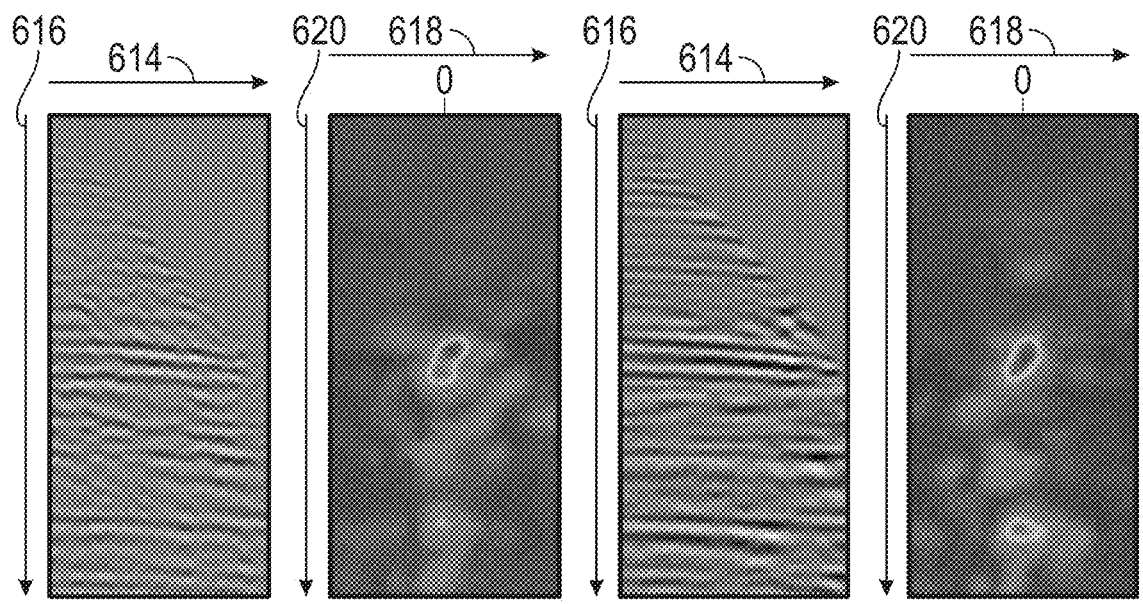

FIG. 6C shows a stochastic image gather from the simultaneous common-offset migration and its corresponding moveout semblance is shown in FIG. 6D. The stochastic image gather shown in FIG. 6C displays seismic reflections at an increasing two-way travel time, indicated by the vertical axis (616). The horizontal axis (614) represents an increasing offset. FIG. 6E shows a migrated CMP created from a trace-by-trace reverse time-migration (RTM) and its corresponding moveout semblance is shown in FIG. 6F. Comparing the gathers of FIGS. 6C and 6E, the main subsurface reflectors) are both adequately imaged.

The moveout semblances of FIGS. 6D and 6F show similar results as well. Velocity analysis may be performed on the more efficient simultaneous common-offset migration. FIGS. 6D and 6F have a horizontal axis (618) representing moveout, with zero in the center of the horizontal axis, increasing in positive and negative directions moving away from zero and the vertical axis (620) represents depth increasing downward. The results from the examples of FIG. 6 and FIG. 5 both illustrate that the novel simultaneous common-offset migration method, may be used efficiently used for seismic imaging and velocity analysis, even in cases of complex subsurface geology.

Figure 7:
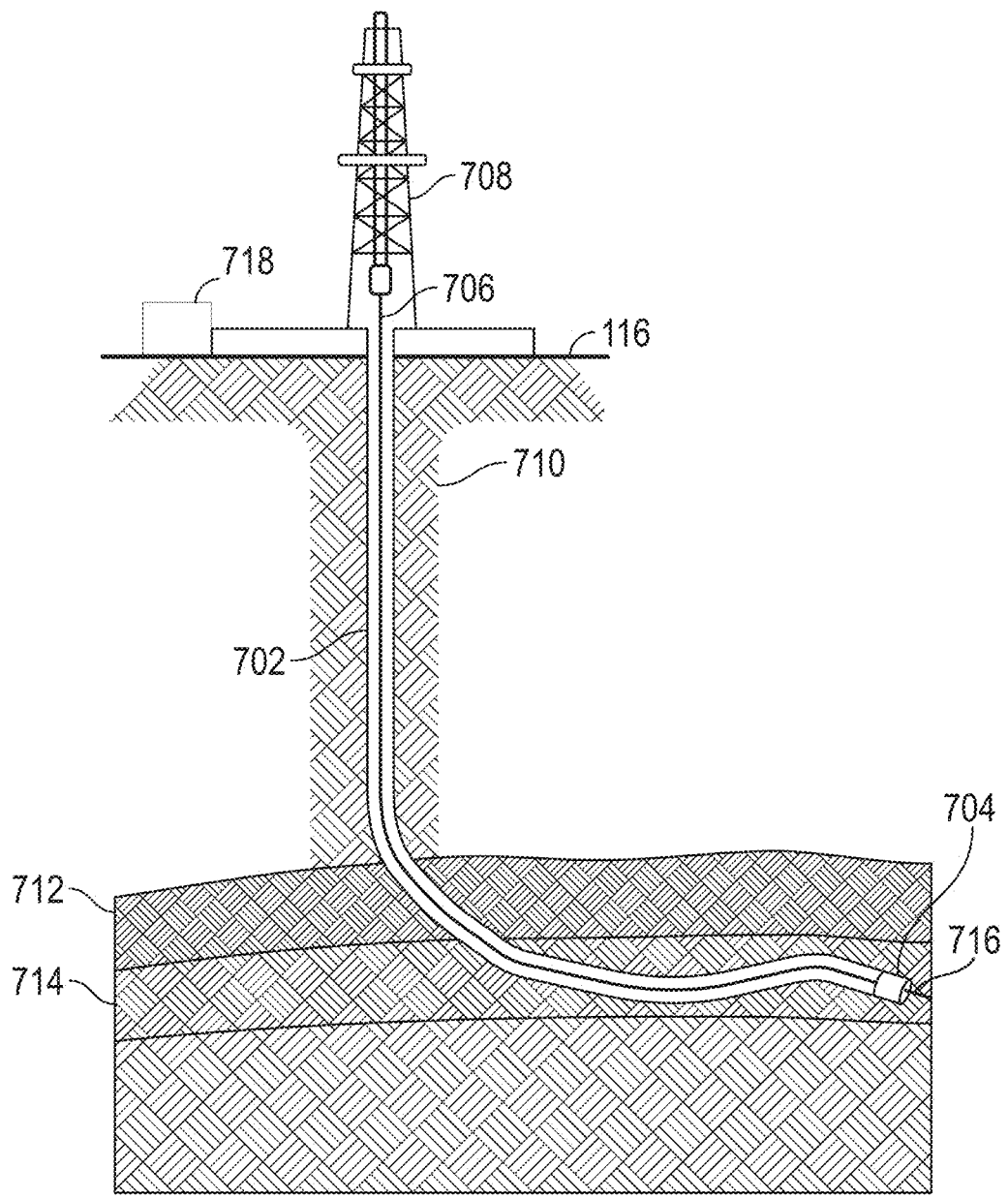
FIG. 7 shows a system in accordance with one or more embodiments.

FIG. 7 illustrates a drilling system in accordance with one or more embodiments. The seismic image may aid in identifying a target (714) within the subterranean region of interest with a likelihood of containing hydrocarbons. A wellbore path (716) may be planned using a wellbore path planning system (718), based at least in part, on the target (714). Planning the wellbore path (716) may include determining a wellbore path (716) through overburden layers (710) that simultaneously minimizes the length of the wellbore path (716) and ensures the wellbore path (716) enters the hydrocarbon reservoir at the desired location and at the desired angle. The plan may further ensure the wellbore path (716) avoids drilling hazards, such as shallow gas zone, major fault zones and over pressured formations, while minimizing the torque and drag on the drillstring during drilling. Planning the wellbore path (716) may further include determining the diameter of the wellbore (702) ("caliper") and the locations along the wellbore path (716) at which the caliper may change and at what depths along the wellbore path (716) intermediate casing string may be inserted and cemented. The wellbore plan may include drilling tools, such as drill bits and bottomhole assemblies as required to drill the wellbore (702). The wellbore path (716) may be determined using a wellbore path planning system (718) that may include one or more computer systems, such as the computer system (802) software configured to plan the wellbore path (716).

A wellbore (702) guided by the wellbore path (716) may be drilled by a drilling system in accordance with one or more embodiments. A drilling system includes a wellbore (702) that may be drilled by a drill bit (704) attached by a drillstring (706) to a drill rig (708) located on the surface of the earth (116). The well may traverse a plurality of overburden layers (610) and one or more cap-rock layers (712) to a hydrocarbon reservoir or the target (714).

Figure 8:
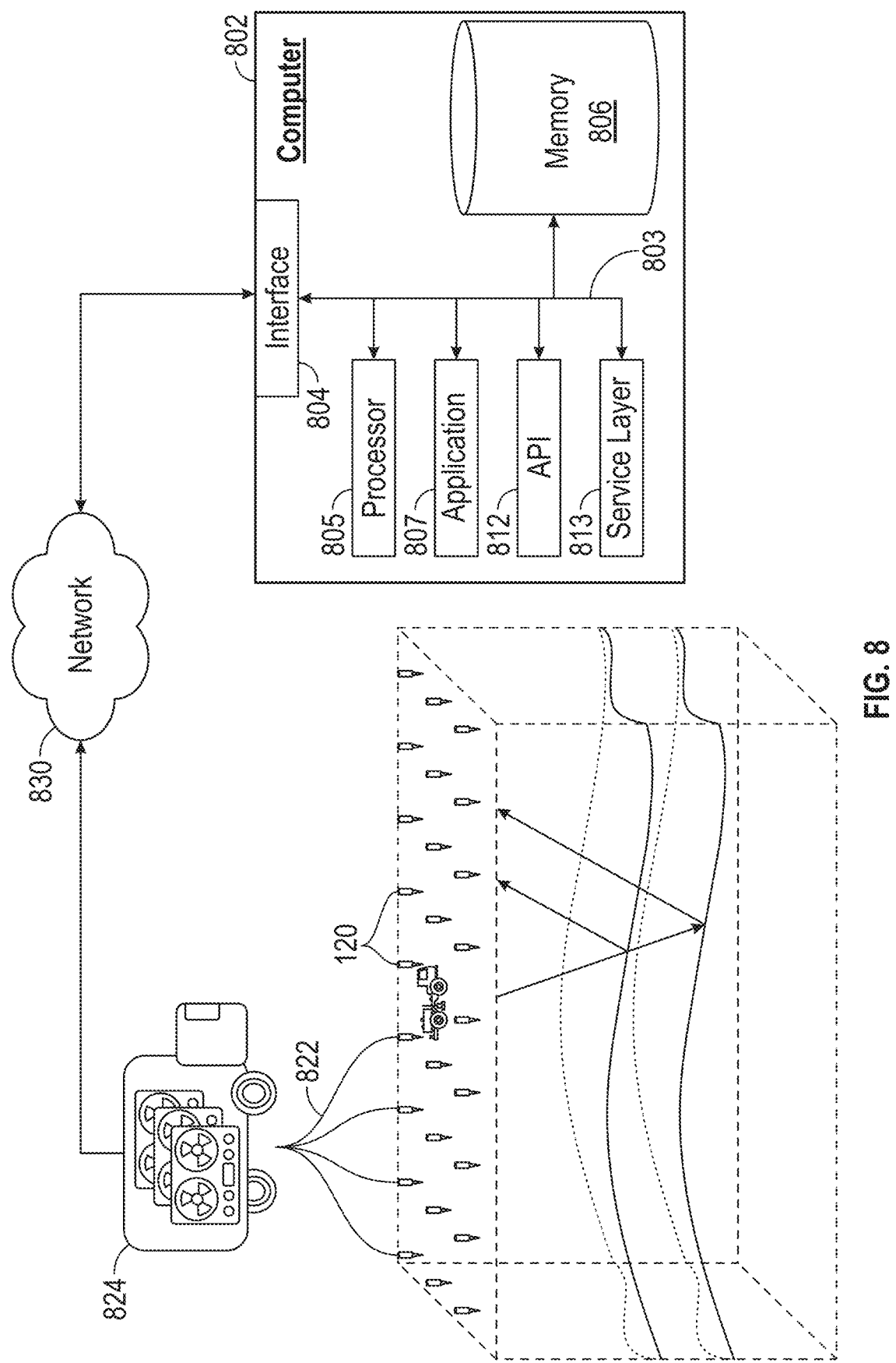
FIG. 8 shows a system in accordance with one or more embodiments.

FIG. 8 shows a seismic recording and processing system, in accordance with one or more embodiments. The data recorded by a plurality of seismic receivers (120) may be transmitted to a seismic recording facility (824) located in the neighborhood of the seismic survey. The seismic recording facility may be one or more seismic recording trucks (824). The plurality of seismic receivers (120) may be in digital or analogue telecommunication with the seismic recording facility (824). The telecommunication may be performed over telemetry channels (822) that may be electrical cables, such as coaxial cables, or may be performed wireless using wireless systems, such as Wi-Fi or Bluetooth. Digitization of the seismic data may be performed at each seismic receiver (120), or at the seismic recording facility (824), or at an intermediate telemetry node (not shown) between the seismic receiver (120) and the seismic recording facility (824).

The seismic data may be recorded at the seismic recording facility (824) and stored on non-transitory computer memory. The computer memory may be one or more computer hard-drives, or one or more computer memory tapes, or any other convenient computer memory media familiar to one skilled in the art. The seismic data may be transmitted to a computer (802) for processing. The computer (802) may be located in or near the seismic recording facility (824) or may be located at a remote location, that may be in another city, country, or continent. The seismic data may be transmitted from the seismic recording facility (824) to a computer (802) for processing. The transmission may occur over a network (830) that may be a local area network using an ethernet or Wi-Fi system, or alternatively the network (830) may be a wide area network using an internet or intranet service. Alternatively, seismic data may be transmitted over a network (830) using satellite communication networks. Most commonly, because of its size, seismic data may be transmitted by physically transporting the computer memory, such as computer tapes or hard drives, in which the seismic data is stored from the seismic recording facility (824) to the location of the computer (802) to be used for processing.

FIG. 8 further depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (713). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of forming a seismic image of a subterranean region of interest, comprising:
    obtaining an observed seismic dataset for the subterranean region of interest;
    determining, using a computer processor, a plurality of common-offset sections from the observed seismic dataset;
    determining, using the computer processor, from each common-offset section, a stochastically migrated common-offset section;
    forming a plurality of stochastic image gathers based, at least in part, on the plurality of stochastically migrated common-offset sections; and
    forming the seismic image based at least in part, on stacking each of the plurality of stochastically migrated common-offset sections.

2. The method of claim 1, wherein determining the stochastically migrated common-offset section from each common-offset section comprises:
    for each of a plurality of realizations:
        selecting a subset of traces from the common-offset section;
        for each member of the subset of traces:
            determining a stochastic operator;
            determining a stochastic receiver wavefield based on the stochastic operator and the trace;
            determining a back-propagated stochastic receiver wavefield;
            determining a forward-propagated source wavefield based, at least in part, on the stochastic operator; and
            forming an incremental image based, at least in part, on the back-propagated stochastic receiver wavefield, the forward-propagated source wavefield, and an imaging condition; and
        determining the stochastically migrated common-offset section based, at least in part, on an accumulation of the incremental images from each realization.

3. The method of claim 2, wherein the stochastic operator applies a random phase shift to each sample of a trace.

4. The method of claim 2, wherein the stochastic operator applies a random phase shift in a frequency domain.

5. The method of claim 1, further comprising:
    identifying a target within the subterranean region of interest with a likelihood of containing hydrocarbons based, at least in part, on the seismic image.

6. The method of claim 5, further comprising:
    planning a wellbore path using a wellbore path planning system based, at least in part, on the target; and
    drilling a wellbore guided by the wellbore path using a drilling system.

7. The method of claim 1, wherein determining each of the plurality of common-offset sections comprises selecting a plurality of common-offset traces each recorded by a source-receiver pair having a source-receiver separation distance within a predetermined range.

8. The method of claim 1, further comprising determining a seismic velocity model based, at least in part, on the plurality of stochastic image gathers.

9. A non-transitory computer readable medium storing instructions executable by a computer processor, the instructions comprising functionality for:
   determining a plurality of common-offset sections from an observed seismic dataset;
   determining, from each common-offset section, a stochastically migrated common-offset section;
   forming a plurality of stochastic image gathers based, at least in part, on the plurality of stochastically migrated common-offset sections;
   forming a seismic image based at least in part, on stacking each of the plurality of stochastically migrated common-offset sections; and
   identifying a target within a subterranean region of interest with a likelihood of containing hydrocarbons based, at least in part, on the seismic image.

10. The non-transitory computer readable medium of claim 9, wherein determining the stochastically migrated common-offset section from each common-offset section comprises:
    for each of a plurality of realizations:
       selecting a subset of traces from the common-offset section;
       for each member of the subset of traces:
          determining a stochastic operator;
          determining a stochastic receiver wavefield based on the stochastic operator and the trace;
          determining a back-propagated stochastic receiver wavefield;
          determining a forward-propagated source wavefield based, at least in part, on the stochastic operator; and
          forming an incremental image based, at least in part, on the back-propagated stochastic receiver wavefield, the forward propagated source wavefield, and an imaging condition; and
    determining the stochastically migrated common-offset section based, at least in part, on an accumulation of the incremental images from each realization.

11. The non-transitory computer readable medium of claim 10, wherein the stochastic operator applies a random phase shift to each sample of a trace.

12. The non-transitory computer readable medium of claim 10, wherein the stochastic operator applies a random phase shift in a frequency domain.

13. The non-transitory computer readable medium of claim 9, wherein determining each of the plurality of common-offset sections comprises selecting a plurality of common-offset traces each recorded by a source-receiver pair having a source-receiver separation distance within a predetermined range.

14. The non-transitory computer readable medium of claim 9, the instructions further comprising functionality for determining a seismic velocity model based, at least in part, on the stochastic common-offset gathers.

15. A system, comprising:
    a seismic acquisition system configured to acquire an observed seismic dataset; and
    a seismic processor configured to:
       receive the observed seismic dataset for a subterranean region of interest from the seismic acquisition system;
       determine a plurality of common-offset sections from the observed seismic dataset;
       determine, from each common-offset section, a stochastically migrated common-offset section;
       form a plurality of stochastic image gathers based, at least in part, on the plurality of stochastically migrated common-offset sections;
       form the seismic image based at least in part, on stacking each of the plurality of stochastically migrated common-offset sections; and
       identify a target within the subterranean region of interest with a likelihood of containing hydrocarbons based, at least in part, on the seismic image.

16. The system of claim 15, wherein determining the stochastically migrated common-offset section from each common-offset section comprises:
    for each of a plurality of realizations:
       selecting a subset of traces from the common-offset section,
       for each member of the subset of traces:
          determining a stochastic operator;
          determining a stochastic receiver wavefield based on the stochastic operator and the trace;
          determining a back-propagated stochastic receiver wavefield;
          determining a forward-propagated source wavefield based, at least in part, on the stochastic operator; and
          forming an incremental image based, at least in part, on the back-propagated stochastic receiver wavefield, the forward propagated source wavefield, and an imaging condition; and
    determining the stochastically migrated common-offset section based, at least in part, on an accumulation of the incremental images from each realization.

17. The system of claim 16, wherein the stochastic operator applies a random phase shift to each sample of a trace in a frequency domain.

18. The system of claim 15, further comprising:
    a wellbore path planning system configured to plan a planned wellbore path based, at least in part, on the target; and
    a drilling system to drill a wellbore guided by the wellbore path.

19. The system of claim 15, wherein determining each of the plurality of common-offset sections comprises selecting a plurality of common-offset traces each recorded by a source-receiver pair having a source-receiver separation distance within a predetermined range.

20. The system of claim 15, wherein the seismic processor is further configured to determine a seismic velocity model based, at least in part, on the at least one stochastic common-offset gathers.

* * * * *